United States Patent [19]
Casebolt

[11] Patent Number: 5,773,108
[45] Date of Patent: Jun. 30, 1998

[54] SELF-COILING COMPOSITE BAND

[75] Inventor: Matthew Casebolt, Fremont, Calif.

[73] Assignee: Lockheed Martin Corporation, Sunnyvale, Calif.

[21] Appl. No.: 663,997

[22] Filed: Jun. 14, 1996

[51] Int. Cl.$^6$ .................................................... B32B 31/00
[52] U.S. Cl. ......................... 428/36.1; 156/169; 156/175; 156/184; 428/36.91
[58] Field of Search .................................... 156/169, 175, 156/184; 428/36.1, 36.91

[56] References Cited

U.S. PATENT DOCUMENTS

| | | | |
|---|---|---|---|
| 4,464,216 | 8/1984 | Gardiner | 156/184 |
| 5,446,474 | 8/1995 | Wade et al. | 343/915 |
| 5,518,568 | 5/1996 | Fawley et al. | 156/175 |

*Primary Examiner*—James J. Bell
*Attorney, Agent, or Firm*—Feix & Feix

[57] ABSTRACT

A containment structure for radially deployable devices in the form of a self-coiling composite band. The composite band is fabricated as a lay up of epoxy resin-impregnated ply layers of cloth material that are wrapped about a mandrel and cured in a specific ordered sequence. The ordered sequence of fabrication steps of applying and curing the resin-impregnated cloth layers to the mandrel provides a desired separation of the cured ply layers of the final composite so that they are located at the outer most regions of the composite and are separated by an intermediate resin layer of desired thickness. This ensures a composite band which is effective to function as a negator-spring or composite clock spring and which also exhibits a good combination of mechanical properties, such as elastic modulus, strength, and resilience. In use, the self-coiling composite band is applied about the periphery of a central hub of a radially deployable device by wrapping it therearound in a reverse curl orientation. A latch, preferably formed of composite material, is provided to the free ends of the composite band to secure the band in its reversed wrapped containment position about the radially deployable device.

18 Claims, 7 Drawing Sheets

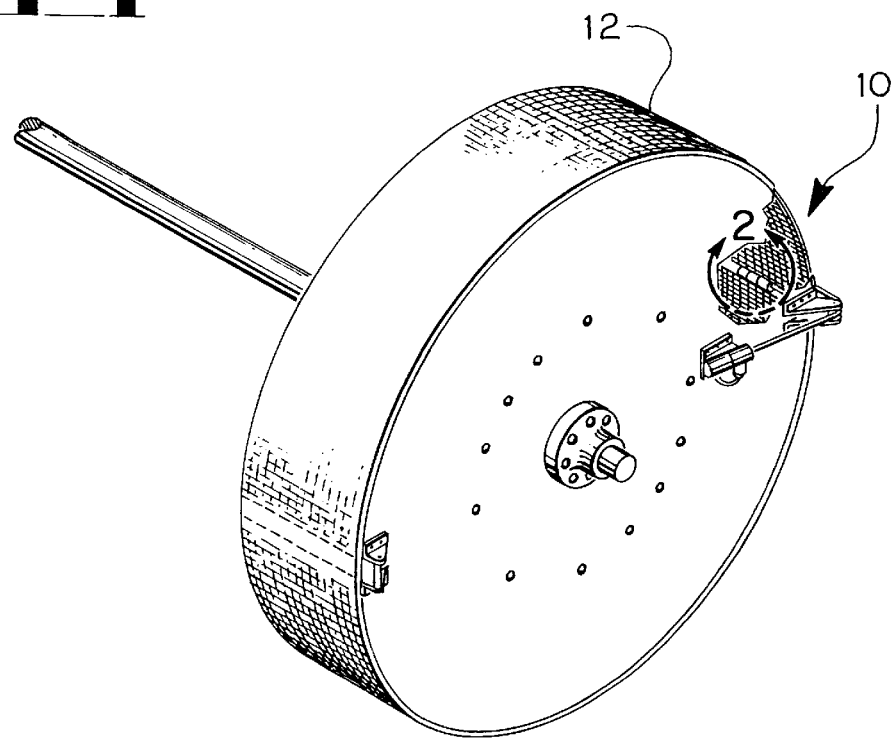
FIG_1
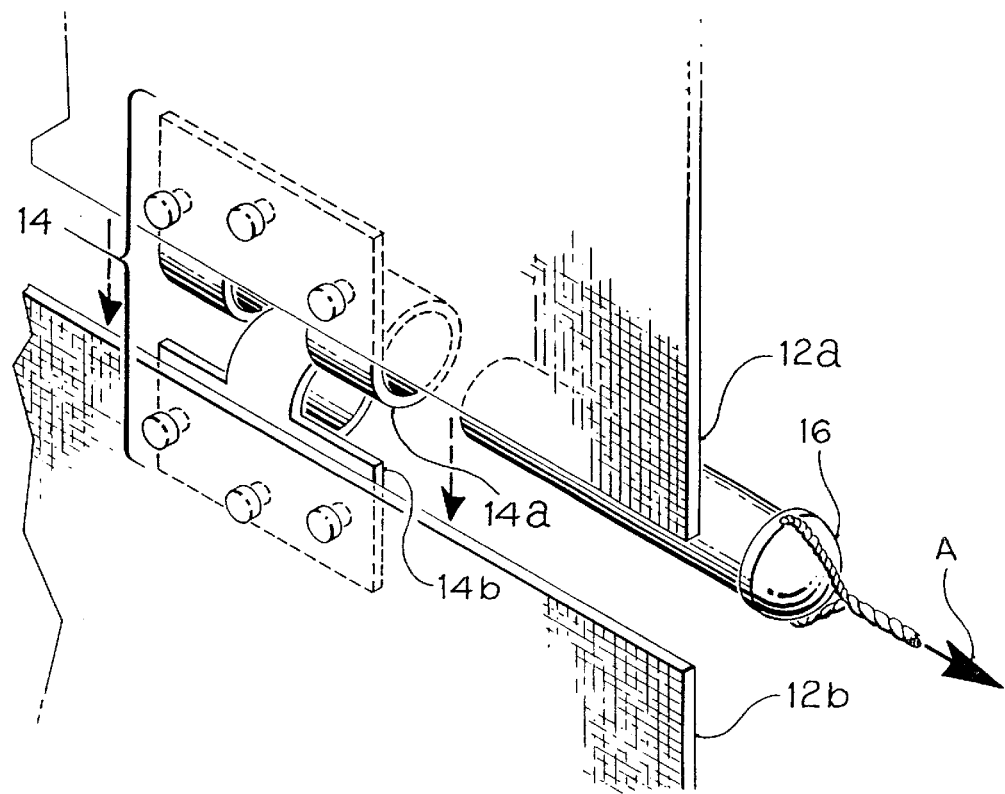
FIG_2

FIG_3
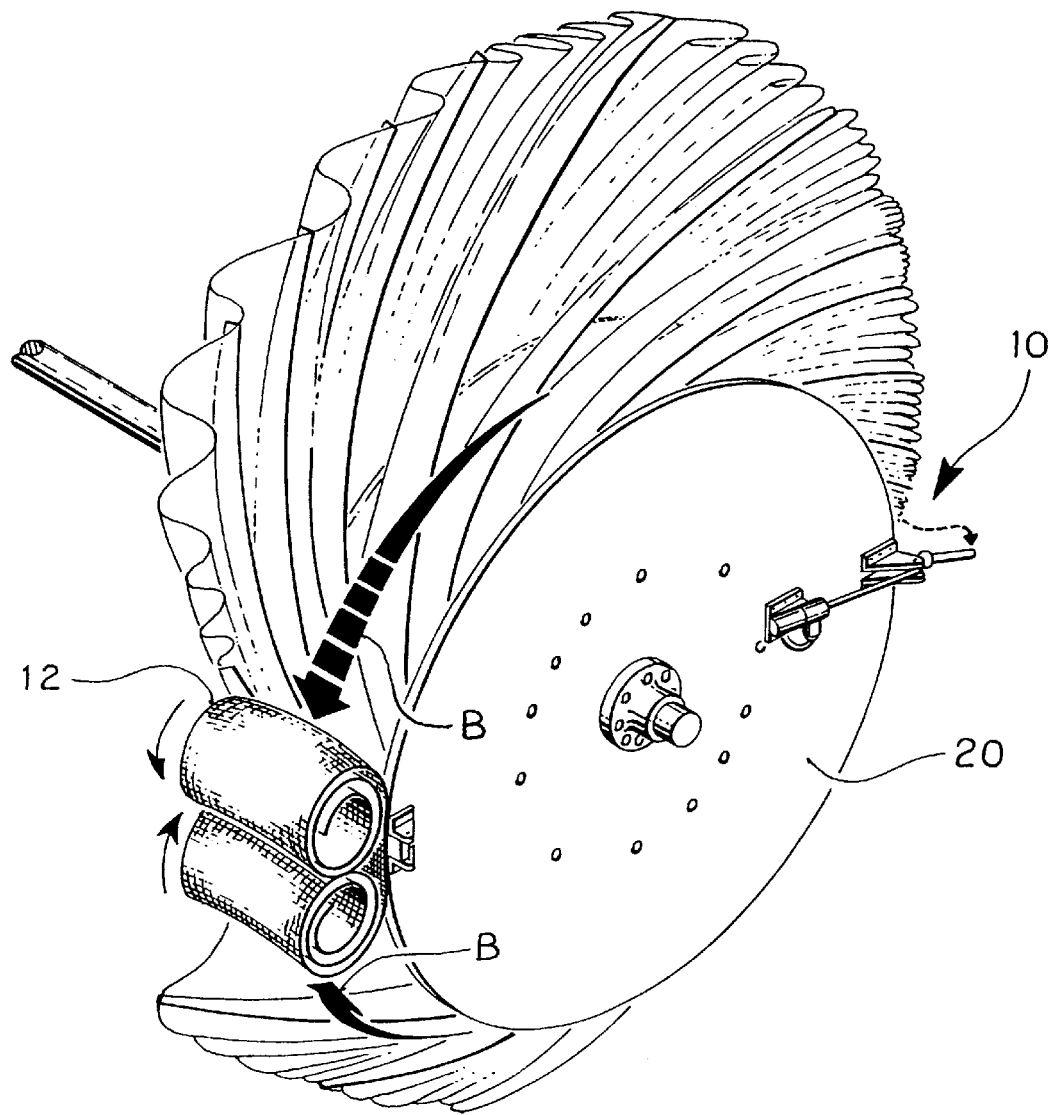

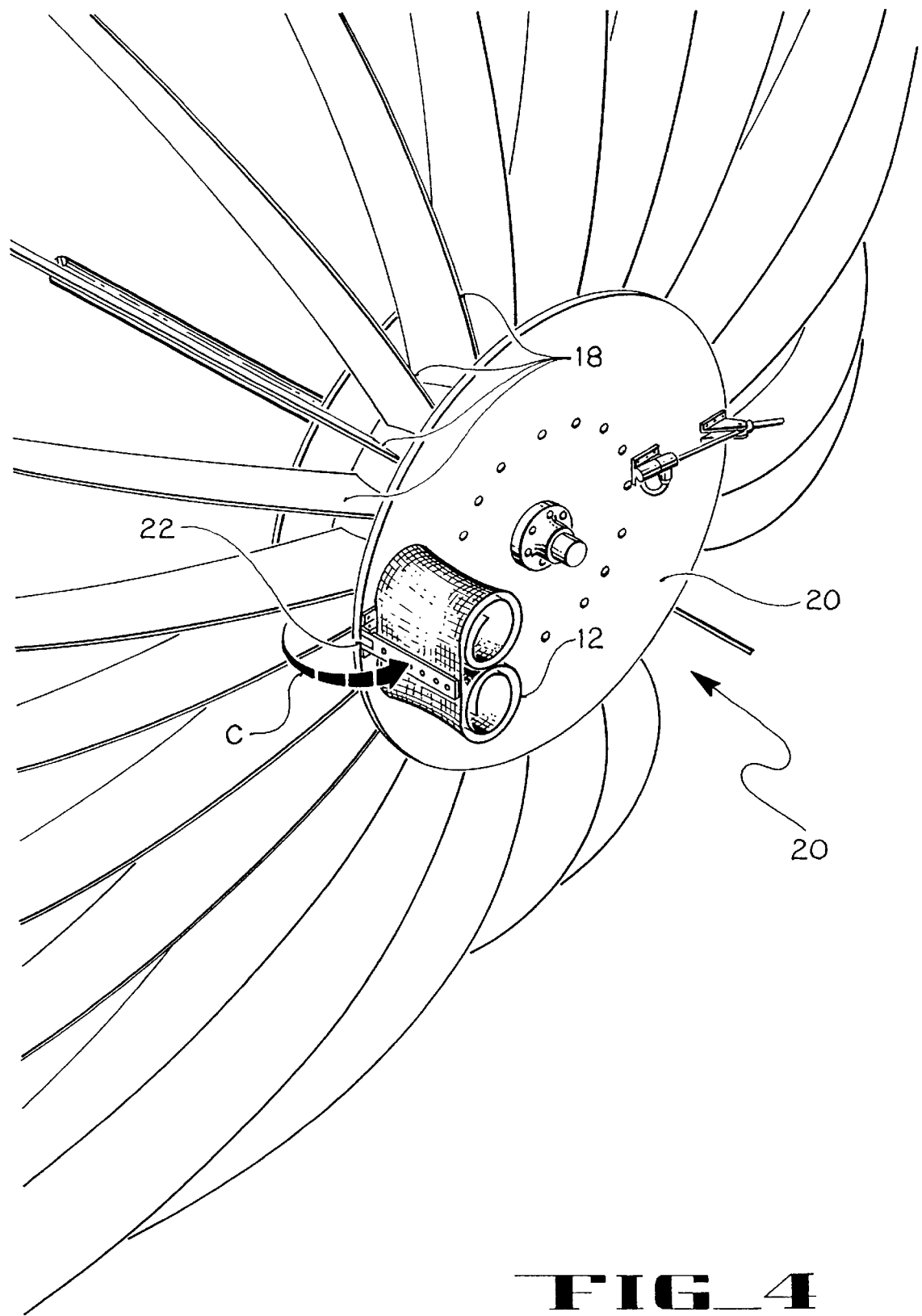
FIG_4

FIG_5
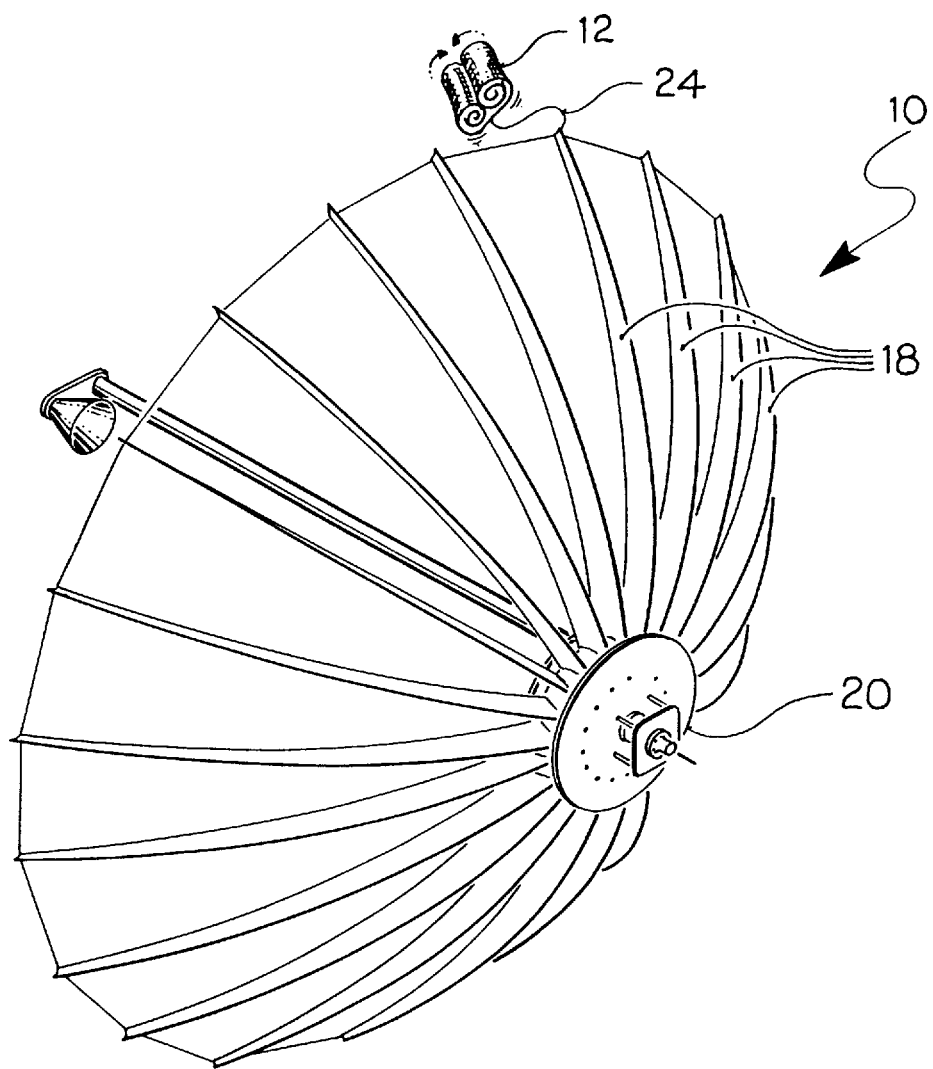

FIG_6
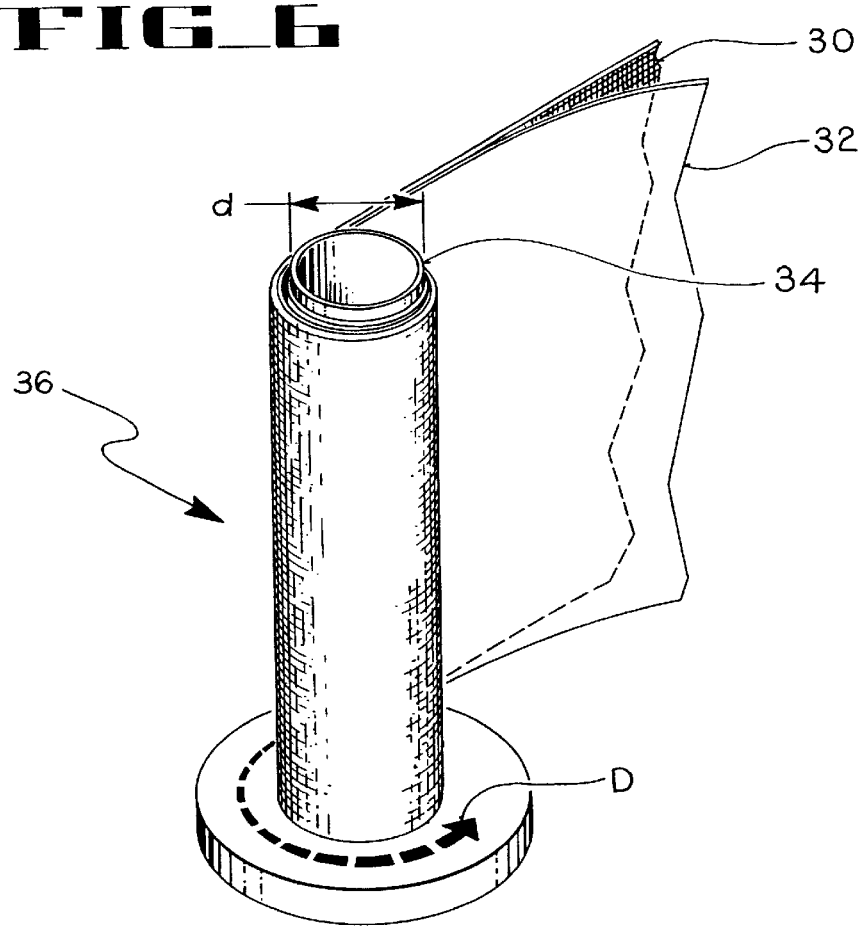
FIG_7
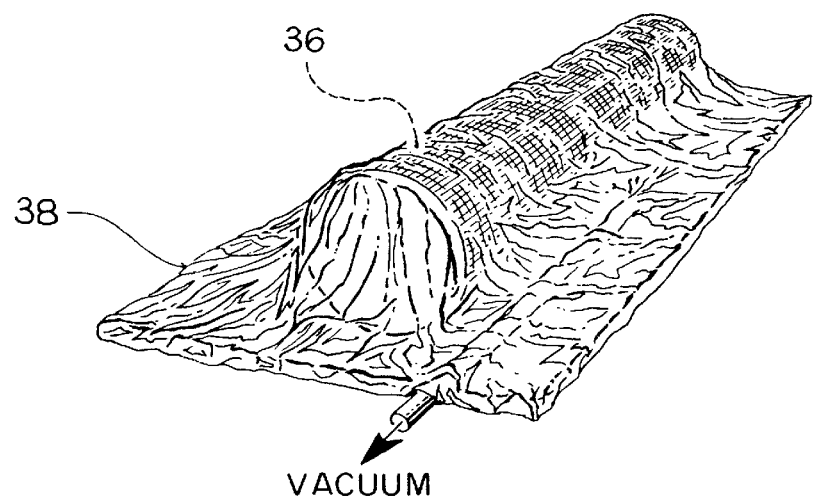

FIG_8
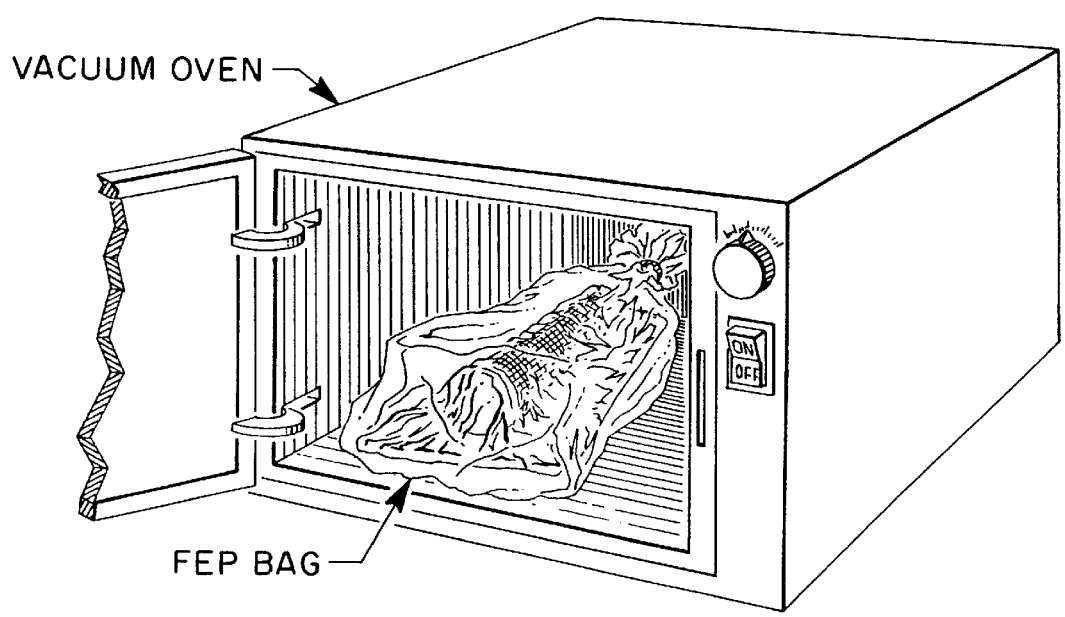

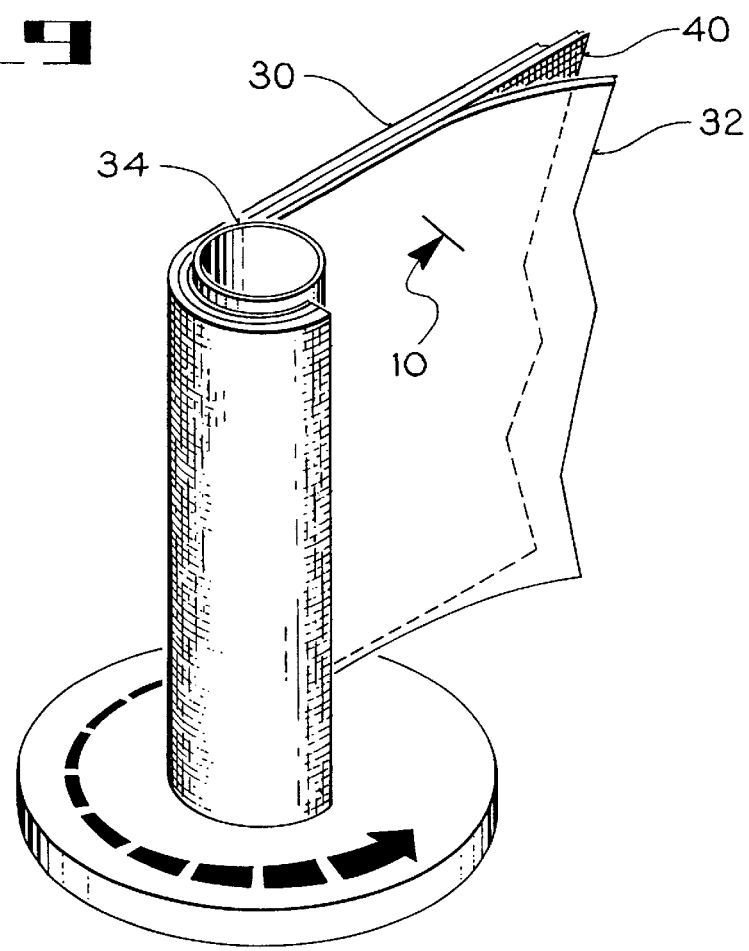
FIG_9
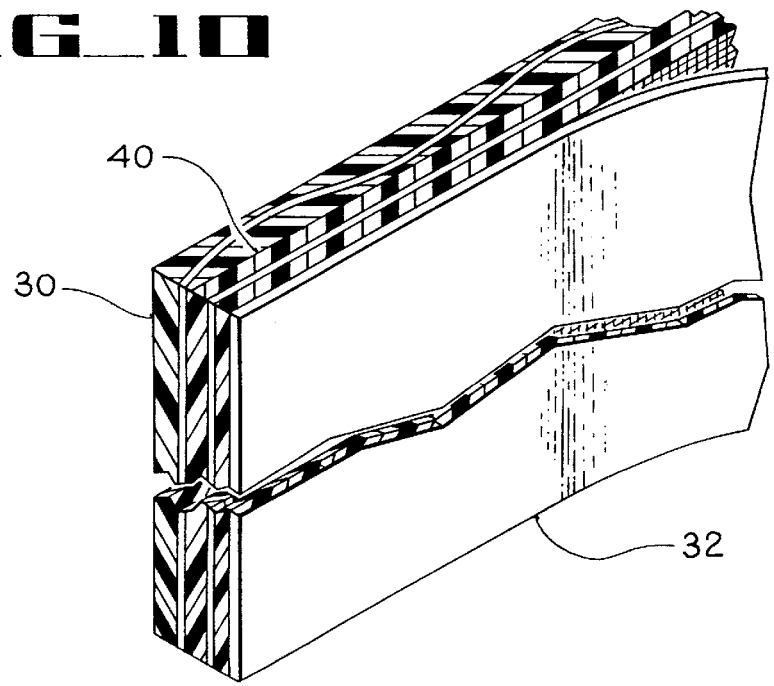
FIG_10

SELF-COILING COMPOSITE BAND

TECHNICAL FIELD

The present invention relates to containment apparatus for containing radially deployable devices, such as wrap rib reflectors or log periodic antennas, in their stowed positions.

BACKGROUND OF THE INVENTION

Radially deployable devices, such as wrap rib reflectors or log periodic antennas of the type intended for use in aerospace applications, typically include a plurality of radially deployable rib members or rib elements disposed pivotally connected about a central spool-shaped hub. The radially deployable rib members are movable between a first, stowed position and a second, radially extended deployed position. In the stowed position, the rib members are wrapped or furled over one another and about a periphery of the hub. The rib members are spring-biased to deploy radially outward upon release from containment in the stowed position.

In accordance with the conventional practice, a number of spaced apart, spring-loaded hinged door assemblies are provided to the periphery of the hub for containing the spring-biased rib members in the stowed position. The door assemblies are operative to open when the radially stowed device has achieved a desired orbit to permit the spring-biased rib members to freely move into their radially extended, deployed position.

As containment structure for aerospace radially deployable reflectors and antennas, the door assemblies of the prior art suffer from many drawbacks. A principle drawback is the high cost associated with the manufacture and maintenance of the door assemblies. The cost to manufacture is prohibitive since the door assemblies require special fabrication of many small parts. Standardization of hardware items is not practical since the individual parts must be sized and configured for each reflector/antennae application.

A related drawback is the overall complexity of the containment design in view of the use of many specially fabricated small parts. Numerous rivets are needed to attach each of the doors to the hub and spring-loaded hinges are also required to control the opening operation of the doors. The specification of many small parts compromises the overall reliability and maintenance of operation. It is well recognized by those familiar with the design of mechanical systems that the reliability of the mechanical system can be improved by orders of magnitude when the number of parts used is kept to a bare minimum. Accordingly, it would be desirable to reduce the number of moving parts in the containment structure for such radially deployable devices to as few as possible to improve reliability and maintenance of the overall mechanical system.

Another drawback associated with the prior art door assemblies is that they consist primarily of metallic parts and thus present an undesirable weight penalty for aerospace applications. Each door assembly, including attachment rivets, spring-loaded hinges and the door them selves together weigh on the order of a fraction of a pound. This weight quickly adds up for large scale applications. The elimination of the requirement of a plurality of individual door assemblies and their associated attaching and opening hardware in favor of a single light weight containment device would be highly desirable.

Finally, the use of metallic parts in the door assemblies also increases the likelihood that undesirable passive intermodulation products (PIM) will be generated in the radially stowed device. PIM is a type of interference which occurs in high power radio frequency communications systems which involve simultaneous transmit and receive operation of RF energy. PIM is an important consideration in the design of radially deployable reflectors and log periodic antennas. Loose metal-to-metal contacts are known to be sources of PIM. Therefore, a containment structure for radially deployable devices of the type described which does not include any metallic components would be highly desirable.

Accordingly, there is a need in the art for containment structure for containing the deployable rib members of radially deployable devices, such as a wrap rib reflectors or log periodic antennas, which overcome the above-identified problems associated with the metallic door assemblies of the prior art containment structure.

SUMMARY OF THE INVENTION

It is therefore a principle object of the present invention to provide a containment structure for radially deployable devices which is simple in design, lightweight, an is of low cost to manufacture and can be easily retrofitted to a wide variety of existing radially deployable device designs.

It is a related object of the invention that the containment structure be fabricated from nonmetallic parts so as not to increase the likelihood of generation of PIM interference in the radially deployable device.

It is another object of the invention that the containment structure utilize its own internally stored energy to enable the containment structure to retract and stow itself out of the way of the deployable ribs of the radially deployable device upon release of the containment structure from a containment position and therefore eliminate the use of additional and numerous special fabrication spring-loaded hinge mechanisms common to the containment devices of the prior art.

Briefly, in accordance with a preferred embodiment of the invention, the containment structure for radially deployable devices is constructed as a self-coiling composite band which is fabricated as a lay up of epoxy resin-impregnated ply layers of cloth material that are wrapped about a mandrel and are cured in a specific ordered sequence. The ordered sequence of fabrication steps of applying and curing the resinimpregnated cloth layers to the mandrel provides a desired separation of the cured ply layers of the final composite so that they are located at the outer most regions of the composite and are separated by an intermediate resin layer of desired thickness. This ensures a composite band which is effective to function as a negator-spring or composite clock spring and which also exhibits a good combination of mechanical properties, such as elastic modulus, strength, and resilience.

In use, the self-coiling composite band is applied about the periphery of a central hub of a radially deployable device by wrapping it therearound in a reverse curl orientation. In this way, the reverse wrapped composite band is able to contain the radially deployable rib members of the radially deployable device. Since the natural spring curl of the composite band has been reversed, the composite band has internally stored energy which enables it to retract and move out of the way of the deployment path of the radially deployable rib members upon release from the containment position.

A latch, clasp or hinge assembly is provided to the free ends of the composite band to secure the band in its reversed wrapped containment position about the radially deployable device. The latch, clasp or hinge assembly is preferably fabricated as a composite structure.

In one advantageous embodiment of the invention, the cloth material of the ply layers comprise woven fabric and the fibers of the woven fabric are oriented at 0° and 90° relative to the axis of the mandrel during the lay up procedure. This fiber orientation provides a composite band which is desirably flat and smooth in a width-wise direction so that cupping and/or warpage of the composite band is substantially non-existent.

Since the composite band can be fabricated from all nonmetallic parts, it is particularly well suited for use in PIM-sensitive communications satellite and reflector applications.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

The accompanying drawings incorporated in and forming a part of the specification, illustrate several aspects of the present invention, and together with the description serve to explain the principles of the invention.

FIG. 1 is an isometric perspective view of a radially deployable device as shown in a stowed position and being contained by a self-coiling composite band in accordance with one embodiment of the present invention.

FIG. 2 is an enlarged fragmentary view of the clasp region of the composite band shown encircled by arrow 2 in FIG. 1.

FIG. 3 is an isometric perspective view similar to FIG. 1 and which shows the radially deployable device in an intermediate stage of deployment just after release and retraction of the self-coiling composite band.

FIG. 4 is an enlarged isometric perspective view similar to FIGS. 1 and 3 and which shows the radially deployable device in a fully deployed position with the self-coiling composite band fully retracted and moved out of the way of the radially extendible rib members.

FIG. 5 is an isometric view of a radially deployable device in a deployed position and which shows the attachment of the composite band to a tip of one of the radially extendible rib members in accordance with an alternate embodiment of the invention.

FIGS. 6–9 illustrate in tutorial fashion the methods step involved in the fabrication of the self-coiling composite band of the present invention.

FIG. 10 is an enlarged fragmentary sectional view of the composite band structure in an intermediate stage of fabrication.

Reference will now be made in detail to various present preferred embodiments of the invention, examples of which are illustrated in the accompanying drawings.

DETAILED DESCRIPTION OF THE PREFERRED EMBODIMENTS

With reference to FIG. 1, there is shown a radially deployable device 10 contained in its stowed position by a self-coiling composite band 12 constructed in accordance with a preferred embodiment of the present invention.

The types of radially deployable devices that are found to be especially well suited for containment by the self-coiling composite band 12 of the present invention include a wide variety of aerospace communications equipment, such as log periodic antenna array and wrap rib antennas or reflectors of the kind disclosed in U.S. Pat. No. 5,446,474 issued to Wade et al.

It is understood, however, that the composite band 12 of the present invention is not limited to aerospace applications, but also has utility in a wide range of terrestrial applications. In other words, the composite containment device is useful for containing just about any type of radially deployable device.

As best seen in FIG. 2, the composite band 12 is held in place about the radially deployed device 10 by use of a simple clasp or latch mechanism 14 that joins the free ends 12a, 12b of the composite band 12. In particular, a first latch component 14a of the latch mechanism 14 is attached to free end 12a and a second latch component 14b is attached to free end 2b. The two latch components 14a, 14b are held together by a removable pin 16. As shown in FIG. 2, the pin 16 is being moved out of retaining engagement with the two latch components 14a, 14b as indicated by arrow A. This action releases the ends 12a, 12b of the composite band 12 from engagement with each other. The latch mechanism 14 and all associated hardware that is used to secure the latch mechanism 14 it to the composite band 12 are preferably made of composite materials. This selection of materials is desirable in particular for aerospace applications which involve high power radio frequency communications systems since the use of all composite materials avoids introducing any unnecessary loose metal-to-metal contacts which are known to be sources of undesirable PIM interference in such systems.

Referring now to FIGS. 3–4, the release of the free ends 12a, 12b permits the self-coiling composite band 12 to assume its normal, unstressed curl position whereby it will retract itself as indicated by directional arrows B and move out of the way of the radially extendible rib members 18 which extend outwardly from the hub 20 of the radially deployable device 10. As best seen in FIG. 4, the composite band 12 may be hinge-connected to the hub 20 by a hinge assembly 22. Hinge assembly 22 helps to pivot the retracted composite band out of the way of the radially extendible rib members 18. This pivoting movement is indicated by directional arrow C.

The hinge assembly 22 also keeps the composite band 12 attached to the hub 20 which is useful in the event that the radially deployable device 10 will be redeployed in the future. Also, it is desirable to keep the composite band tethered to the radially deployed device 10 in some fashion so that the composite band, which could be ejected with a significant momentum, does not do damage other parts of the space craft.

In FIG. 5, there is shown an alternate embodiment of the present invention wherein the composite band 12 is simply tethered by a cord 24 to a tip portion of one of the radially extendible rib members 18 of the radially deployable device 10.

With reference to FIGS. 6–10, the method of fabrication of the self-coiling composite band of the present invention will be described.

In accordance with a first fabrication step, a first strip of uncured, resinimpregnated cloth material 30 is wrapped around a mandrel 34 (as indicated by the direction arrow D) along with an intermittent layer of non stick release film 32 so that the release film is interposed between successive wrap layers of the first prepreg cloth strip 30. The length of the prepreg cloth strip 30 is selected to fit the hub diameter of the radially deployed device to which it intended to contain. Also, the diameter of the mandrel 34 is selected per application.

Common release films for mold applications, such as fluorinated ethylene propylene (FEP) are especially suitable for use in the present invention.

Selection of a suitable cloth and resin material entails evaluation of the following characteristics: cure stiffness, modulus, bending stress, resilience, ultimate stress, tensile strength, and thermal properties. Suitable cloth materials include those consisting of carbon or graphite filaments, quartz yarns, fiberglass and high modulus organic filaments of aramids and the like. An especially preferred material for the cloth is KEVLAR® fabric. A suitable epoxy type resin may be used to impregnate the selected cloth material.

The wrap configuration 36 consisting of the first prepreg cloth strip 30, release film 32 and mandrel 34 is then placed within a vacuum bag 38 and is cured in an autoclave or vacuum oven in accordance with the standard composite curing practice. This is shown in tutorial fashion in FIGS. 7 and 8. Excess resin is removed from the cloth material under the force of pressure and heat during the cure cycle.

After the above described cure cycle (hereafter referred to as the "first cure cycle"), the prepreg cloth strip 30, now a cured composite layer, is removed from the mandrel 34 and the release film 32 is discarded.

The first cured composite layer 30 is then rewrapped about the mandrel 34 along with a second prepreg cloth strip 40 and intermittent release film layer 32'. This is shown in FIGS. 9–10.

The wrap configuration 36' consisting of the first cured layer 30, second prepreg cloth strip 40 and release film 32' undergoes a second cure cycle similar to the first cure cycle as described above with reference to FIGS. 7 and 8. The first and second wrap layers are cured separately to ensure a desired separation of the first and second ply layers by an intermediate resin layer.

After the second cure cycle, the wrap configuration 36' is unwrapped from the mandrel 34 and the release film 32' is discarded.

The end result of the above described two-step cure cycle of the separate prepreg cloth strips is a self-coiling composite band structure that has the mechanical properties of a negator-spring or clock spring. Additional composite structures, such as the latch mechanism 14 (FIG. 2), composite hinge assembly 22 (FIG. 4). or tether 24 (FIG. 5) may then be secured to the composite band structure. Additional layers of prepreg cloth material may be provided to the composite band during manufacture in order to provide reinforcement to the points of attachment of the additional composite structures to the composite band.

The above described fabrication method advantageously locates the ply layers of the composite band structure to the outermost regions of the composite and ensures that the ply layers are separated by a thickness of intermediate resin layer sufficient to provide a desired combination of the mechanical properties of bending stress, tensile strength, elasticity, and resilience.

The composite band has a first unstressed mode where it assumes its natural curled position upon removal from the mandrel 34. In use, the composite band is placed in a second stressed mode where it is wrapped in a reverse curl orientation about the periphery of the hub of a radially deployable device.

In order to produce a self-coiling composite band structure of the type described having a minimum of cupping or warpage in the width-wise direction of the composite structure, it is desirable to orient the interlacing strands of warp and filling threads of the cloth weave at 0° and 90° relative to the axis of the mandrel 34. In other words, the woven cloth material that is used as the ply layers in the composite band preferably comprises two groups of fibers (warp and fill), each of which are oriented orthogonal to one another. Also, the first group of fibers is preferably oriented generally parallel to the length direction or long axis of the composite band and the second roup of fibers is oriented generally parallel to the width direction or short axis of the composite band.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of fabricating a self-coiling composite band for containing, in a stowed position, radially outwardly deployable rib elements of a radially deployable device such as a wrap rib reflector or log periodic antenna, the method comprising:

a) wrapping a first strip of resin-impregnated cloth material about a mandrel of a specified diameter;

b) interposing a layer of release material between successive wrap layers of said first strip of resin-impregnated cloth material as it is being wrapped about the mandrel;

c) curing the first strip of resin-impregnated cloth material in its wrapped configuration about the mandrel to provide a pre-cured composite strip having an unstressed mode wherein the pre-cured composite strip assumes a coil having a coil diameter substantially equal to the mandrel diameter;

d) uncoiling the pre-cured composite strip from the mandrel;

e) applying a second strip of uncured resin-impregnated cloth material to the pre-cured composite strip;

f) wrapping the lay up comprising the second strip of resin-impregnated cloth material and the pre-cured composite strip over the mandrel;

g) interposing a layer of release material between successive wrap layers of said second strip of resin-impregnated cloth material as it is being wrapped about the mandrel;

h) curing the lay up comprising the second strip of resin-impregnated cloth material and the pre-cured composite strip to provide a self-coiling composite band structure having top and bottom fibrous ply layers separated by a intermediate resin layer, wherein the composite band structure includes:

i) sufficient strength and elasticity to enable the composite band structure to be wrapped in a reverse curl direction about a hub periphery of a radially deployable device of a specified diameter in order to contain radially deployable rib elements of the radially deployable device in a stowed position; and ii) sufficient resilience to enable the composite band structure to return to an original unstressed coiled position upon release from containment of the radially deployable device.

2. The method of claim 1 wherein the cloth material comprises a woven cloth having warp and filling stands oriented orthogonal to each other and at substantially 0° and 90° with respect to a center axis of the mandrel.

3. The method of claim 1 wherein the cloth material comprises KEVLAR® material.

4. The method of claim 2 wherein the cloth material comprises KEVLAR® material.

5. The method of claim 1 which further includes:
   a) forming a latch mechanism from composite materials; and
   b) adhering the latch mechanism to free ends of the composite band.

6. The method of claim 5 wherein the cloth material comprises a woven cloth having warp and filling stands oriented orthogonal to each other and at substantially 0° and 90° with respect to a center axis of the mandrel.

7. The method of claim 6 wherein the cloth material comprises KEVLAR® material.

8. The product of the method of claim 1.
9. The product of the method of claim 2.
10. The product of the method of claim 3.
11. The product of the method of claim 4.
12. The product of the method of claim 5.
13. The product of the method of claim 6.

14. A self-coiling composite band for containing, in a stowed position, the radially outwardly deployable rib elements of a radially deployable device such as a wrap rib reflector or log periodic antenna, the composite band comprising:
   a) a multi-ply composite lay up including top and bottom fibrous ply layers separated by an intermediate resin layer;
   b) said top and bottom fibrous ply layers being formed from resinimpregnated strips of cloth material that are wrapped about a mandrel of a specified diameter and cured in place in order to produce a composite band structure which assumes a natural coil shape when unstressed and is biased to return to its original coil shape when stressed by reversing a natural curl direction of the composite band:
   c) said intermediate resin layer having a thickness, in combination with said fibrous ply layers and in relation to a coil diameter of said composite band, effective to:
      i) provide the composite band with sufficient strength and elasticity to enable the composite band to be wrapped in a reverse curl direction about a hub periphery of a radially deployable device of a specified diameter without cracking in order to contain radially deployable rib elements of the radially deployable device in a stowed position, and
      ii) provide the composite band with sufficient resilience to enable the composite band to return to its original unstressed coiled position upon release from containment of the radially deployable device.

15. The invention of claim 14 wherein the strips of resin-impregnated cloth material comprise woven cloth having warp and filling stands oriented orthogonal to each other and at substantially 0° and 90° with respect to a center axis of the mandrel.

16. The invention of claim 14 wherein the strips of resin-impregnated cloth material comprises KEVLAR® material.

17. The invention of claim 16 wherein the strips of resin-impregnated cloth material comprises KEVLAR® material.

18. The invention of claim 14 which furthere includes a composite latch mechanism attached to free ends of the composite band.

* * * * *